(No Model.)  7 Sheets—Sheet 2.

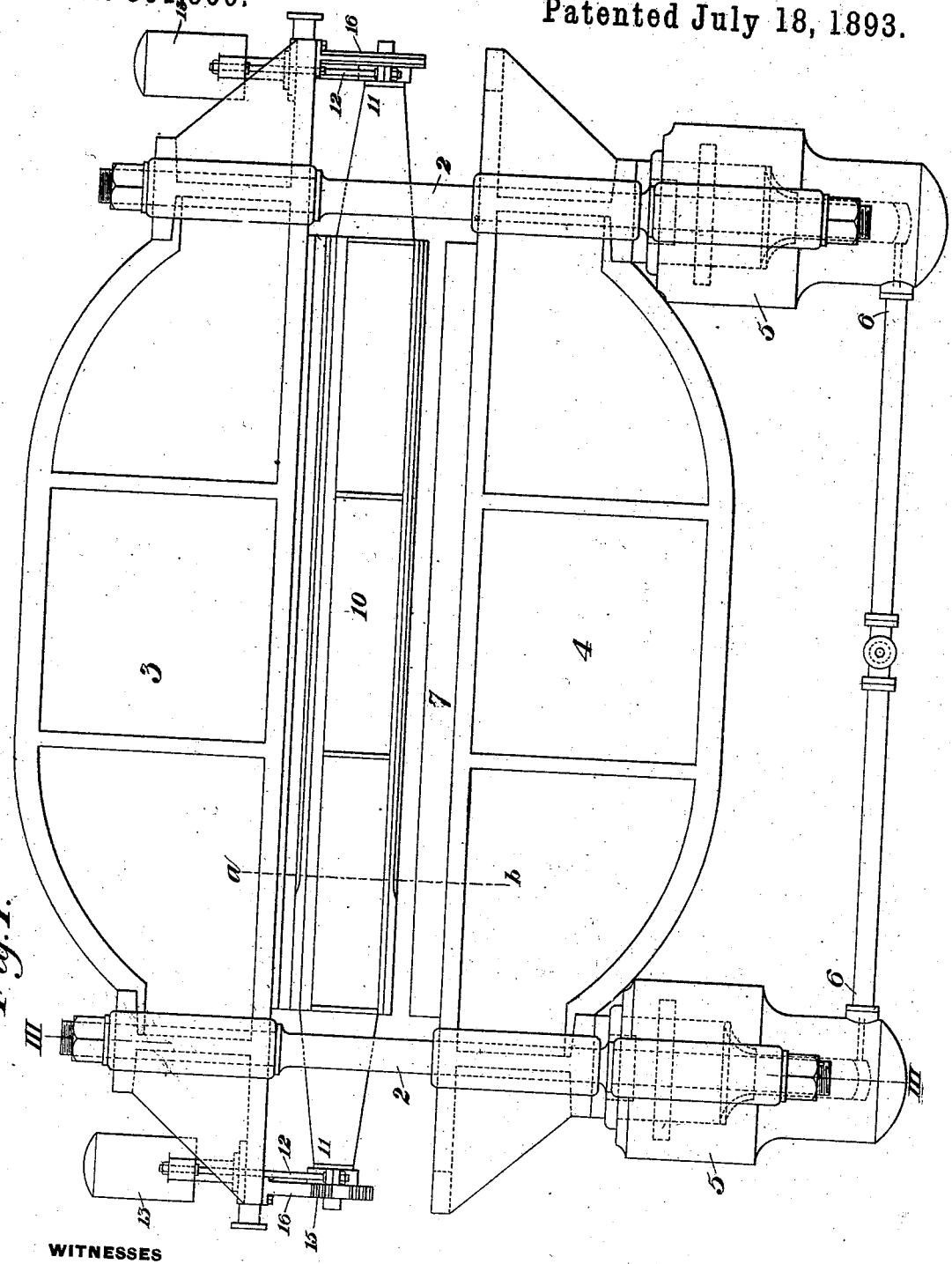

R. R. SINGER.
METHOD OF AND APPARATUS FOR THE MANUFACTURE OF HOLLOW ARTICLES.

No. 501,900.  Patented July 18, 1893.

WITNESSES
Thomas W. Bakewell
H. L. Gill

INVENTOR
Robt R Singer (No Model.) 7 Sheets—Sheet 3.
R. R. SINGER.
METHOD OF AND APPARATUS FOR THE MANUFACTURE OF HOLLOW ARTICLES.
No. 501,900. Patented July 18, 1893.
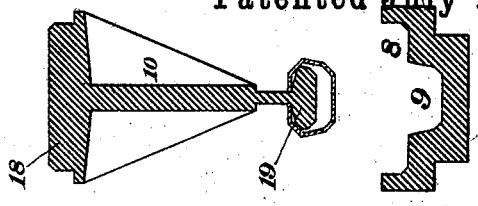
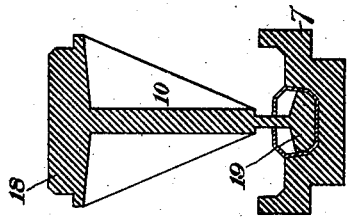
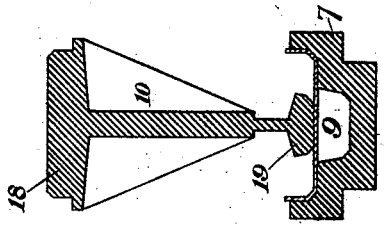
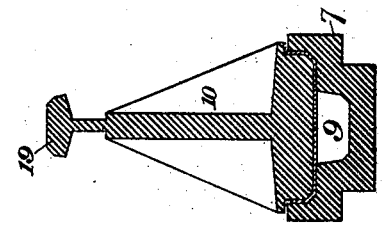
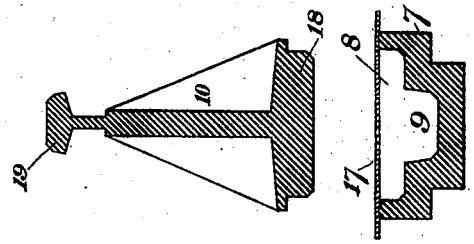
WITNESSES
INVENTOR (No Model.)

R. R. SINGER.
METHOD OF AND APPARATUS FOR THE MANUFACTURE OF HOLLOW ARTICLES.

No. 501,900.

7 Sheets—Sheet 4.

Patented July 18, 1893.

WITNESSES
Thomas W. Bakewell
N. L. Gill

INVENTOR
Robt R Singer (No Model.) 7 Sheets—Sheet 5.
R. R. SINGER.
METHOD OF AND APPARATUS FOR THE MANUFACTURE OF HOLLOW ARTICLES.

No. 501,900. Patented July 18, 1893.

WITNESSES
Thomas W. Bakewell
H. L. Gee

INVENTOR
Robt. R. Singer (No Model.) 7 Sheets—Sheet 6.
R. R. SINGER.
METHOD OF AND APPARATUS FOR THE MANUFACTURE OF HOLLOW ARTICLES.

No. 501,900. Patented July 18, 1893.

WITNESSES
Warren W. Swartz
H. M. Corwin

INVENTOR
Robert R. Singer
by W. Bakewell & Sons
his Attorneys.

(No Model.) 7 Sheets—Sheet 7.

R. R. SINGER.
METHOD OF AND APPARATUS FOR THE MANUFACTURE OF HOLLOW ARTICLES.

No. 501,900. Patented July 18, 1893.

WITNESSES

INVENTOR
Robert R. Singer
by W. Bakewell & Sons
his Attorneys.

UNITED STATES PATENT OFFICE.

ROBERT R. SINGER, OF PITTSBURG, PENNSYLVANIA.

METHOD OF AND APPARATUS FOR THE MANUFACTURE OF HOLLOW ARTICLES.

SPECIFICATION forming part of Letters Patent No. 501,900, dated July 18, 1893.

Application filed May 9, 1892. Serial No. 432,229. (No model.)

*To all whom it may concern:*

Be it known that I, ROBERT R. SINGER, of Pittsburg, in the county of Allegheny and State of Pennsylvania, have invented a new and useful Improvement in the Method of and Apparatus for the Manufacture of Hollow Articles, of which the following is a full, clear, and exact description, reference being had to the accompanying drawings, forming part of this specification, in which—

Figure 3:
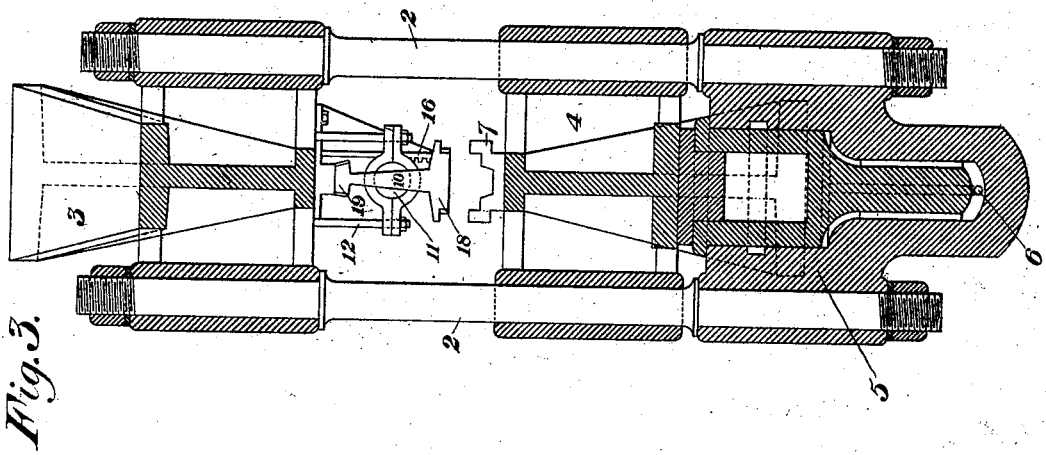
Figure 2:
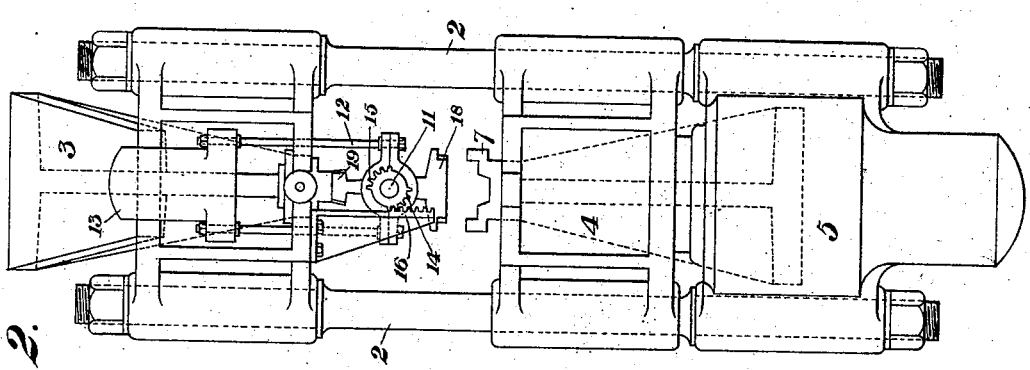
Figure 10:
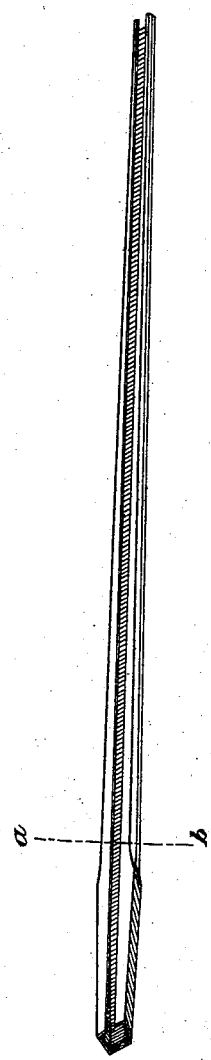
Figure 12:
Figure 11:
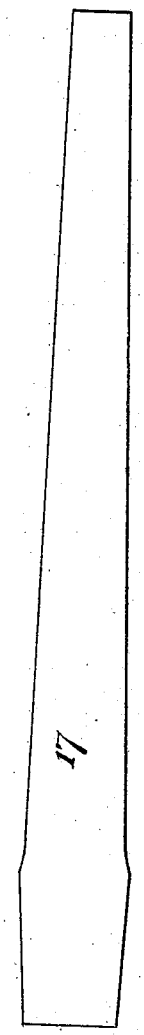
Figure 13:
Figure 14:
Figure 16:
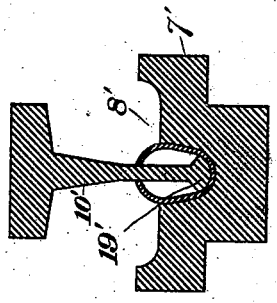
Figure 19:
Figure 15:
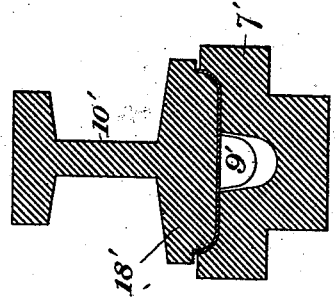
Figure 17:
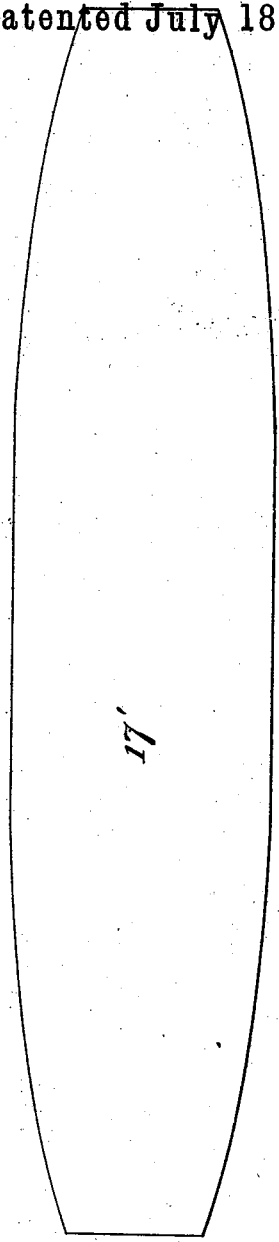
Figure 18:
Figure 23:
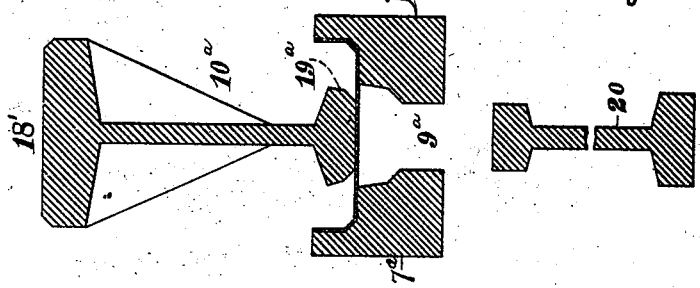

Figure 1 is a side elevation of a machine adapted to contain and operate my improved die mechanism. Fig. 2 is an end elevation thereof. Fig. 3 is a vertical section on the line III—III of Fig. 1. Figs. 4 to 9 show the dies in vertical cross-section on the line $a$—$b$, in various positions. Fig. 4 shows the dies with the blank inserted preparatory to the first step of the operation. Fig. 5 shows the dies in conjunction upon the blank. Fig. 6 shows the male-die inverted and about to engage the blank. Fig. 7 shows the die after the blank has been bent. Fig. 8 shows the male-die with the blank thereon, after separation from the female-die. Fig. 9 is a cross-section of the finished article, before uniting of its edges; and Fig. 10 is a perspective view thereof. Fig. 11 is a plan view of the original blank. Figs. 12, 13 and 14 are views showing in edge view modified forms of blank. Figs. 15 and 16 are cross-sectional views of dies of modified construction, adapted to the manufacture of whiffle-trees, single-trees, &c. Fig. 17 is a plan view of the single-tree blank. Fig. 18 is an edge view thereof; and Fig. 19 is an end view of the blank after it has been shaped by the dies. In Figs. 20 to 26 I show in vertical cross-section a modified construction of the dies, in which the female die is made in two parts and operates in conjunction with a movable bottom or blank holder, the function of which is to hold the bottom of the blank and to prevent it from bending. These figures show the parts in successively different relative positions they occupy from the beginning to the end of the operation.

Like symbols of reference indicate like parts in each.

My invention relates to a method and apparatus for the manufacture of hollow articles such as vehicle-tongues, whiffle-trees, &c., designed to effect the same purpose, but in improved manner, as the subject of a prior patent, No. 469,952, granted to me on March 1, 1892.

The method claimed in the present application consists in making a hollow article such as a vehicle-tongue by bending a sheet metal blank into the form of a wide trough with rectangularly turned edges, and then bending it again at the middle in a die cavity, the effect of which is to bring toward each other the turned edges and to complete the article.

The apparatus claimed by me, consists of a female-die adapted to the practice of said invention and having two cavities, one a wide cavity for the first shaping of the blank, and the other a cavity formed within the first for the final shaping.

It also consists of such female-die in combination with suitable male-dies; and of a reversible die piece having on the same stock two male-die faces; and in certain features of construction herein described and specifically recited in the claims.

I show in the drawings a hydraulic machine of a kind well adapted to be used in connection with my improvement; but, if desired, the construction and form of the machine may be changed without variance from my invention. The machine has a frame of posts 2, an entablature or cap 3, a moving die-head 4, set on the posts which serve as guides therefor, and actuating hydraulic motors 5, the movable elements of which bear on the moving die-head and are adapted to actuate the same. The cylinders are supported by the posts and are provided with connected valve-controlled water-supply pipes 6, which cause them to act in unison in moving the die-head. The machine may be constructed so that either the female die or the male die shall be moved by the motor-cylinders. It is somewhat more convenient that the female-die 7 should be thus moved, and I have accordingly shown it set on the moving-head 4 and secured thereto. This die has a longitudinal cavity 8, of shallow trough form having vertical sides, and in the middle of this cavity is a second cavity 9, deeper and narrower than the cavity 8. These cavities taper in outline to correspond with the outline of the article desired to be formed therein. There are two male-dies 18, 19, one for each cavity of the female die and of corresponding shape, and for various reasons I prefer to fix them to opposite sides of the same stock or die-head. This die-head 10 is provided at its ends with trunnions 11, journaled in bearings in yokes 12, carried by the moving parts of hydraulic motors 13, which are set at the ends of the entablature 3. By means of these motors the die-head can be moved laterally in vertical direction, in order to invert the position of the male die, such inversion being effected by means of segmental gearing 14, 15, fixed to the trunnions and adapted to mesh with stationary racks 16 situate at the ends of the die-head and on respectively opposite sides thereof. To invert the male-die the die-head is reciprocated vertically, whereupon, on the down stroke of the die-head, the engagement of the rack with the gear segment 15 at one end of the die-head turns the latter one-fourth of a revolution, and on the up-stroke, the engagement of the gear segment 16 at the other end of the die-head with its rack completes the semi-revolution of the die-head. This is a convenient and simple mode of reversing the position of the dies, but within the scope of the claims in which the segmental gearing is not expressed, other means of reversing the dies may be used.

As thus constructed, the operation of the machine is as follows:—The metal blank 17, consisting of a piece of sheet metal preferably tapering in form, as shown in Fig. 11, in order to produce a tapering hollow tongue, is laid over the die-cavity 8 of the die 7 in the manner shown in Fig. 4. The die-head 4 is then elevated by means of the motors 5, and raising the die 7 presses the blank 17 against the die 18 and thereby shapes the blank into the form of a wide trough, as shown in Fig. 5. Then, by the means above explained, the die-head 10 is inverted so as to bring the die 19 opposite to the female-die, as shown in Fig. 6, and then, by elevating the female die, the male die forces the already bent blank into the cavity 9, thereby reducing the blank to the shape shown in Fig. 7, and bending its edges upward and inward against the stock of the die-head, which for this purpose is contracted above the die. The male and female dies are then separated, leaving the blank hanging on the male die, as shown in Fig. 8. When withdrawn longitudinally from this die, the blank is in the form shown in Figs. 9 and 10, and when its edges are welded or otherwise secured together the tongue is completed. The blank 17, instead of being of uniform thickness from end to end, may be tapered in the manner shown in either of Figs. 12, 13 and 14.

It will be understood that within the scope of the broader claims of this application, the dies 18, 19, may be carried by separate stocks or die-heads, that the female die may be stationary and the male-die movable, or that the cavities 8 and 9 may be formed in separate female dies. Also that the machine may be varied in construction, and that the form of the dies may be altered in various ways to suit the requirements of the articles to be shaped thereby.

The method claim of this application is not limited to the peculiar construction of dies recited in the other claims. Thus the first bending of the blank by which a wide and shallow trough is formed may be done by rolls instead of dies.

In Fig. 15 et seq., I show dies suitable for the manufacture of single-trees and whiffle-trees. In Figs. 15 and 16, the male-dies are shown as on separate stocks. The manner of operation of these dies will be readily understood by those skilled in the art from an inspection of the drawings and the foregoing description; since I have used in these figures the same reference characters as those employed in former figures, distinguishing them by the prime (') mark. The blank used for making the whiffle-tree is preferably thicker in the middle and tapers thence toward the ends, thus giving it strength at the place of greatest strain.

In Figs. 20 to 26 I show a modified construction of apparatus, in which the female-dies are made in two parts, or at least with a cavity extending entirely through the die, and a movable blank-holder, adapted to operate in said cavity. I have designated the parts of this construction by the same reference characters as used for corresponding parts in the preceding figures, distinguishing them by the exponent letter $^a$. The female-die $7^a$ is movable vertically and has a cavity $8^a$ and a narrower middle cavity $9^a$, which extends through the die. The die-head $10^a$ has male-dies $18^a$ and $19^a$ constructed as above described. 20 is a blank-holder or movable follower for holding the metal blank while it is acted upon by the dies. It is provided with actuating mechanism such as a hydraulic motor, and is adapted to move vertically through the cavity $9^a$.

Figure 22:
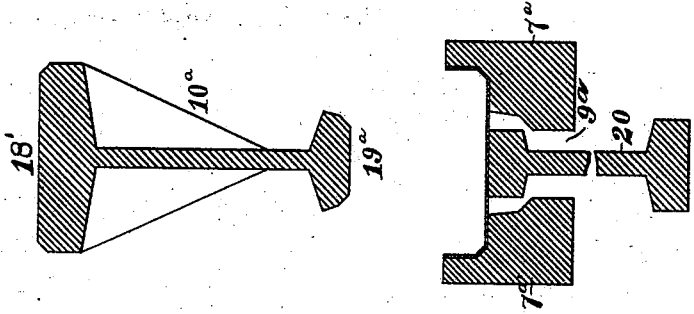
Figure 21:
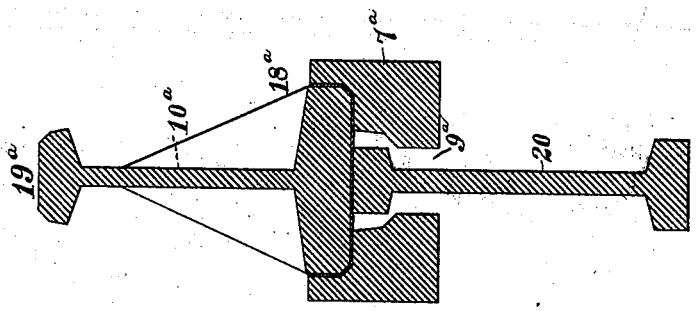
Figure 20:
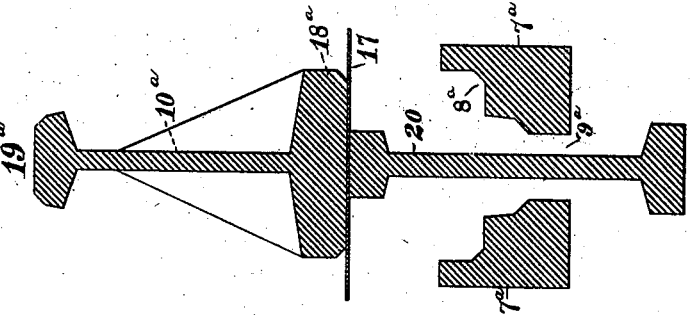
Figure 26:
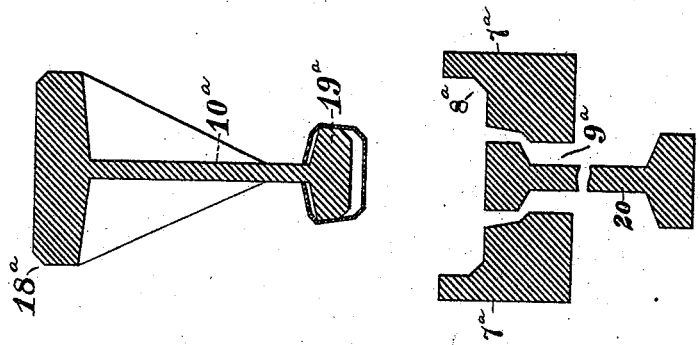
Figure 25:
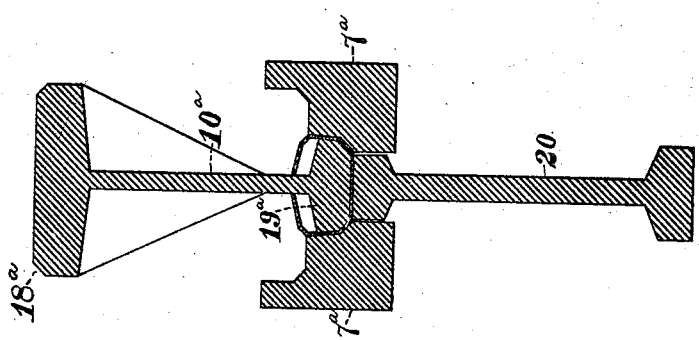
Figure 24:
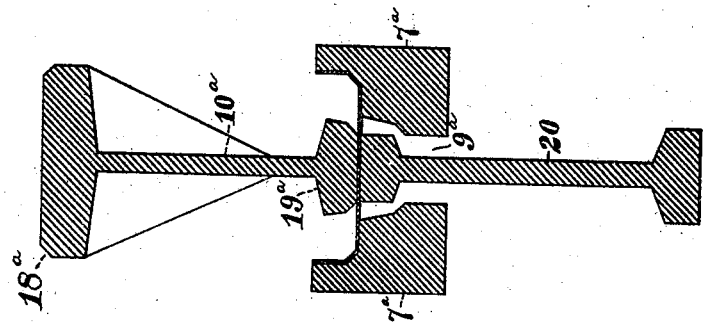

The operation of the dies is as follows:— The follower 20 is first raised so as to engage the blank 17 and to hold it against the die $18^a$, (Fig. 20.) While the blank is so held the female die $7^a$ is lifted and engaging the blank bends it into the form of a trough as shown in Fig. 21. The female die and holder are then lowered and the die-head $10^a$ inverted, as shown in Fig. 22. The female die is then raised to bring the blank against the die $19^a$, (Fig. 23,) the blank holder is raised to engage the blank (Fig. 24), and then, without moving the holder, the female die is raised farther, and the blank being clamped between the parts $19^a$ and 20 is bent in the cavity $9^a$ to the shape shown in Fig. 25. The female-die and holder are then withdrawn, (Fig. 26,) leaving the blank on the die $19^a$ from which it may be removed as explained above.

This form of apparatus is included generically within the claims of this application and serves to show that other changes may be made without variance from my invention.

I claim—

1. The method herein described of making vehicle tongues and other hollow articles, which consists in bending a sheet metal blank into the form of a wide trough, and then bending in the middle of said blank a narrower trough, whereby the edges are caused to approach and the hollow article is formed; substantially as and for the purposes described.

2. In apparatus for making vehicle tongues and other hollow articles, a female-die having two cavities one within the other, viz: a wider cavity and an inner narrower cavity, in combination with two trough-bending dies, adapted to enter said cavities in succession, substantially as and for the purposes described.

3. In apparatus for making vehicle tongues and other hollow articles, two female die-cavities, viz., a wider cavity and a narrower cavity adapted to receive the blank after it has been acted on in the cavity first named, and male trough-forming dies adapted to enter said cavities in succession, the second male-die having a head which is contracted above the die, substantially as and for the purpose described.

4. In apparatus for making vehicle tongues and other hollow articles, the combination of a female-die having two cavities one within the other, viz: a wider cavity and an inner narrower cavity, and a reversible die-stock carrying male-dies; substantially as and for the purpose described.

5. In apparatus for making vehicle tongues and other hollow articles, the combination of die-mechanism having two female die cavities, viz: a wider cavity and a narrower cavity adapted to receive the blank after it has been acted on in the cavity first named, and male dies corresponding in form to said cavities, the die of the narrower cavity having a contracted shank to permit near approach of the edges of the metal; substantially as and for the purposes described.

6. A rotary die-head having segmental gearing, racks in connection with which the gearing operates, and means for reciprocating the die-head to accomplish its reversal; substantially as and for the purposes described.

7. In apparatus for making vehicle tongues and other hollow articles, two female die-cavities, viz: a wider cavity and a narrower cavity adapted to receive the blank after it has been acted on in the cavity first named; male trough-bending dies, and mechanism for actuating the dies; substantially as and for the purposes described.

In testimony whereof I have hereunto set my hand this 21st day of April, A. D. 1892.

ROBT. R. SINGER.

Witnesses:
W. B. CORWIN,
THOMAS W. BAKEWELL.